Figure 1:
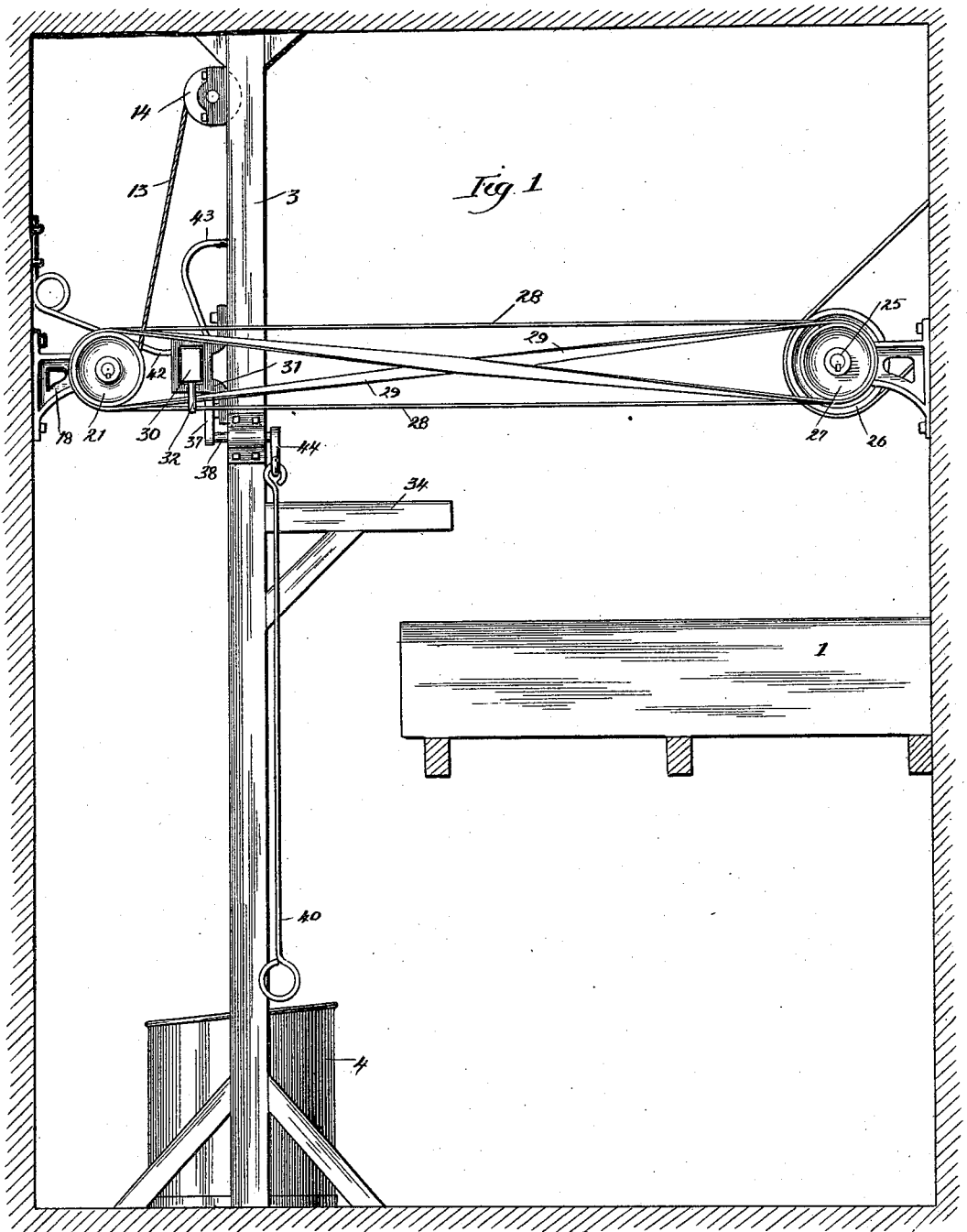

(No Model.)  3 Sheets—Sheet 1.

C. J. JEPPESEN.
MILK ELEVATOR.

No. 478,161.  Patented July 5, 1892.

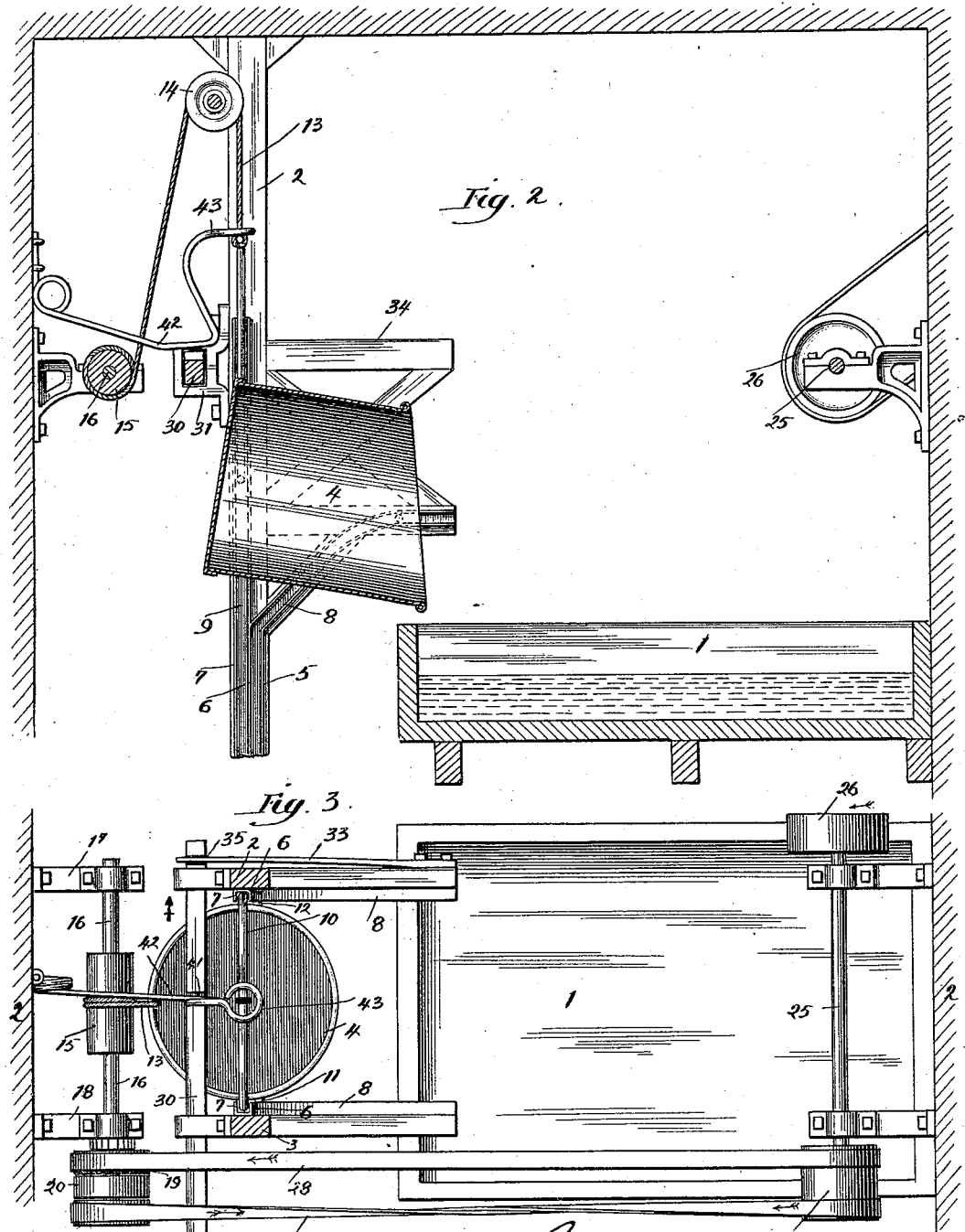

(No Model.) 3 Sheets—Sheet 3.
C. J. JEPPESEN.
MILK ELEVATOR.
No. 478,161. Patented July 5, 1892.
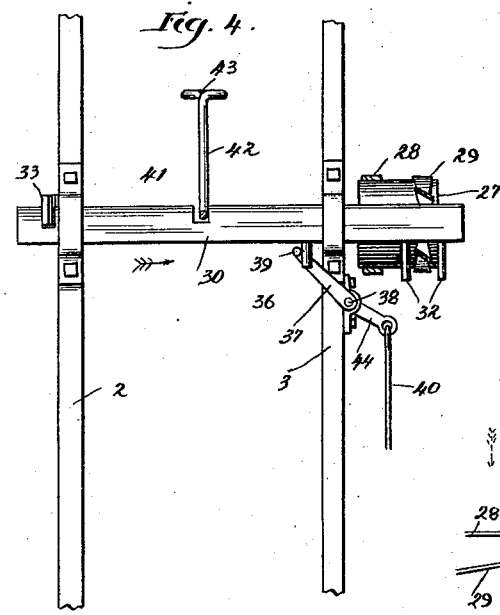
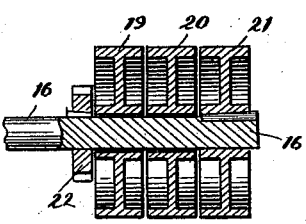
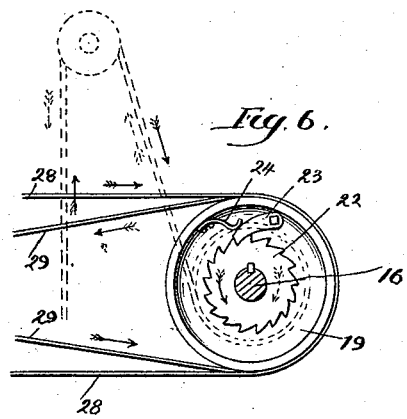
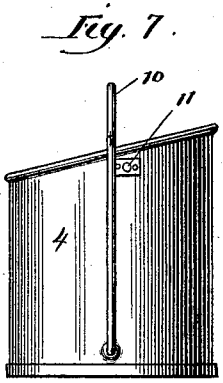
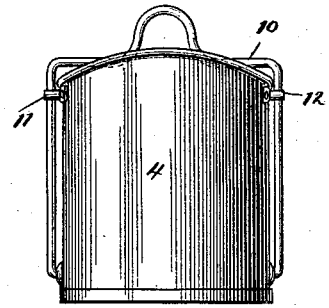
Witnesses:
John L. Jackson.
Nellie McKibben.
Inventor:
Christen J. Jeppesen
By Bond Adams & Pickard
Attorneys

UNITED STATES PATENT OFFICE.

CHRISTEN J. JEPPESEN, OF HEBRON, INDIANA.

MILK-ELEVATOR.

SPECIFICATION forming part of Letters Patent No. 478,161, dated July 5, 1892.

Application filed February 18, 1892. Serial No. 422,157. (No model.)

*To all whom it may concern:*

Be it known that I, CHRISTEN J. JEPPESEN, a subject of the King of Denmark, residing at Hebron, in the county of Porter and State of Indiana, have invented certain new and useful Improvements in Milk-Elevators, of which the following is a specification, reference being had to the accompanying drawings, in which—

Figure 1 is a side elevation. Fig. 2 is a longitudinal vertical section on line 2 2 of Fig. 3, the bucket being tilted. Fig. 3 is a top or plan view. Fig. 4 is a detail, being a partial end view. Fig. 5 is a detail, being a central longitudinal section of the shaft, showing the operating-pulleys. Fig. 6 is a detail, being an end elevation of the innermost pulley, showing the ratchet device. Fig. 7 is a side view of the bucket, and Fig. 8 is an end view of the bucket.

My invention relates to devices for elevating milk, adapted for use more particularly in creameries, where it is necessary to elevate the cream to a storage or supply tank. My invention may, however, be used for any other purpose to which it is adapted.

The object of my invention is to provide a new and improved elevator which will be adapted for the use above referred to, which object I accomplish as illustrated in the drawings and as hereinafter set forth. That which I regard as new will be pointed out in the claims.

In the drawings, 1 indicates a tank adapted to receive the milk or other substance to be elevated, which tank may be located at any suitable point.

2 3 indicate two vertical parallel beams, which are suitably secured in position at such a distance apart that they will be adapted to receive a bucket 4 between them, as best shown in Fig. 3. I prefer to use a bucket shaped as shown in Fig. 2; but a receptacle of any other desired shape may be used.

5 6 7 indicate three flanges formed on the inner surface of each standard 2 3, as best shown in Fig. 2, which flanges are arranged to form tracks or guides 8 9 to direct the motion of the bucket 4 as it moves up or down between the standards 2 3, as will be hereinafter described. The flanges 5 6 form the track 8, and the flanges 6 7 form the track 9. The track 8 at its upper end is curved, as best shown in Fig. 2, and extends outward from the standards 2 3, as shown, for purposes which will be hereinafter described.

The bucket 4 is provided with a bail 10, which is pivotally connected at opposite sides of the bucket and near its lower end, as best shown in Figs. 7 and 8.

11 12 indicate pins or lugs formed on opposite sides of the bucket, preferably near its upper end, which pins are adapted to move in the guides 8 on the standards 2 3, as best shown in Fig. 3. The bail 10 is adapted to move in the guide 9, as also shown in Fig. 3. By this construction, if the bucket 4 is moved upward between the standards 2 3, when the pins 11 and 12 reach the inclined portion of the track 8 they will move away from the standards 2 3, while the bail 10 will continue to move upward in a vertical line. This will cause the bucket to be tilted, as shown in Fig. 2, and thereby emptied of its contents. The inclined portion of the track 8 is so placed as to cause the tilting of the bucket at a point over the tank 1, as shown.

13 indicates a rope or cable, which is attached to the bail 10, and after passing over a pulley 14, suitably mounted at the upper end of the standards 2 and 3, is wound upon a drum 15, mounted upon a shaft 16, as best shown in Fig. 2. The shaft 16 is mounted in suitable bearings 17 and 18. Mounted upon one end of the shaft 16 are three pulleys 19, 20, and 21. The pulleys 19 and 20 are loosely mounted upon the shaft, while the pulley 21 is keyed thereto or otherwise suitably secured thereupon.

22 indicates a ratchet-wheel, which is mounted upon and keyed to the shaft 16, close to the pulley 19, as best shown in Fig. 5.

23 indicates a pawl, which is mounted upon the pulley 19, which pawl is adapted to engage the ratchets of the wheel 22. The pawl 23 is held in engagement with the ratchet by means of a spring 24, as best shown in Fig. 6. The arrangement of the ratchet-wheel 22 and the pawl 23 is such that when the shaft 16 is rotated to wind up the rope 13 and thereby elevate the bucket 4 it will rotate independently of the pulley 19; but when the shaft 16 is moved in the opposite direction the pawl 23 will engage the teeth of the ratchet-wheel 22 and cause the pulley 19 to rotate with the shaft.

25 indicates a shaft mounted in suitable bearings, which shaft is parallel to the shaft 16 and carries a band-wheel 26 and a drum 27, as best shown in Fig. 3. The drum 27 is opposite the pulleys 19 20 21 and is about as wide as the said three pulleys taken together.

28 indicates a belt, which gears the drum or pulley 27 to the pulley 19.

29 indicates a twisted belt, which connects the pulley 27 with the pulleys 20 or 21, as the case may be.

The shaft 25 is adapted to be driven from any suitable driving mechanism by means of the band-wheel 26.

30 indicates a cross-bar, which is mounted in suitable brackets 31, secured to the beams 2 3, which cross-bar is provided with arms 32, which extend on each side of the belt 29, as best shown in Fig. 4, and are adapted to shift such belt when the bar 30 is moved transversely, as will be hereinafter described.

33 indicates a flat-spring, which at one end is secured to a projecting arm 34, secured to the beam 2, and at the other end fitted into a slot 35, or otherwise suitably connected to the cross-bar 30, as best shown in Fig. 3. The tension of the spring is such that it will be adapted to cause the bar 30 to move in the direction indicated by the arrow in Fig. 4.

36 indicates a lug or pin projecting from the cross-bar 30, preferably near the beam 3, as best shown in Fig. 4.

37 indicates a lever pivotally mounted upon a shaft 38, carried by the beam 3 and provided with a pin 39, adapted to engage the pin 36 upon the cross-bar 30, as shown in Fig. 4.

40 indicates a rod or bar connected to a lever 44, also mounted upon the shaft 38, as best shown in Fig. 1, which rod 40 extends downward to a point where it may be conveniently reached by the operator. By pulling down on the rod 40 the levers 37 44 will act to throw the cross-bar 30 in the direction indicated by the arrow in Fig. 4.

41 indicates a slot or recess formed in the upper side of the cross-bar 30 at about the central point, as shown in Fig. 4.

42 indicates a spring-stop, one end of which is secured to a suitable support, as shown in Fig. 2. The spring 42 is bent so that its lower portion will be adapted to fit into the slot 41 when the bar 30 is in suitable position, and the tension of the spring is such as to hold the spring in such slot. The free end 43 of the spring 42 extends upward, as shown in Figs. 2 and 4, and terminates over the guide 9, in which moves the bail 10. The end 43 of the spring 42 is preferably circular in shape, as shown in Fig. 3, and encircles the lifting-rope 13; but I do not wish to limit myself to that particular arrangement, as the free end of the spring 42 may project over the bail at any other desired point. The height of the free end 43 of the spring 42 is such that when the bucket 4 has been lifted to its highest point the upper portion of the bail 10 will bear upward on the upper portion 43 of the spring 42 and release it from the slot 41 in the cross-bar 30.

The operation of my improved elevator is as follows: When the lifting-rope is wound around the drum 15 in the manner shown in Fig. 2, in order to further wind the lifting-rope upon the drum it will be necessary to rotate the band-wheel 26 in the direction indicated by the arrow in Fig. 3, the cross-bar 30 being in the position shown in Figs. 3 and 4 and the belt 29 being upon the pulley 21, as shown in Fig. 3. When the drum is rotated to wind up the rope 13, it will be seen that the pulley 19 will rotate in an opposite direction; but as the pulley is free to rotate upon the shaft 16 in that direction, owing to the arrangement of the ratchet-wheel 22 and pawl 23, such rotation of the pulley 19 will not effect the operation of the shaft 16. When the cross-bar 30 is in the position shown in Fig. 4, as it is when the bucket is being elevated, the spring 42 will enter the slot 41, thereby holding the bar 30 in such position against the action of the spring 33. When the pins 11 and 12 on the bucket 4 reach the deflected portion of the track 8, the bucket will be overturned, as hereinbefore described, and the bail 10 will move vertically upward until it strikes the upper portion 43 of the spring 42, and it will lift the spring 42 from the slot 41, thereby releasing the bar 30, which will move in the direction indicated by the arrow in Fig. 3 under the action of the spring 33. This movement of the bar 30 will cause the belt 29 to be shifted to the pulley 20, which, as above described, is free to rotate upon the shaft 16. The weight of the bucket 4 will thereby be thrown upon the drum 15 and it will have a tendency to unwind the rope 13 and permit the bucket to drop. The pawl 23 upon the pulley 19, however, will prevent the rapid descent of the bucket, as the teeth of the wheel 22 will be held in engagement with the pawl 23 by the weight of the bucket, and the descent of the bucket will be controlled by the speed of rotation of the pulley 19. Since the rotation of the pulley 19 is controlled by the belt 28 from the pulley 27, it will be seen that the rate of descent of the bucket will be uniform and may be regulated as desired. When it is desired to again cause the bucket to ascend, by pulling downward on the bar 40 the cross-bar 30 will be again moved in the direction indicated by the arrow in Fig. 4 until the slot 41 reaches the position under the spring 42, which will enter such slot and hold the cross-bar in its new position. The belt 29 will at the same time be shifted to the pulley 21 and the shaft 16 will be rotated, winding up the rope 13 on the drum and elevating the bucket.

That which I claim as my invention, and desire to secure by Letters Patent, is—

1. The combination, with a shaft, a hoisting-drum, a hoisting-rope, and a bucket, of fast and loose pulleys mounted upon said shaft, a belt for driving the fast pulley to rotate the shaft, and mechanism thrown into action by a part of the bucket to shift the belt to the loose pulley when the bucket has been elevated, substantially as described.

2. The combination, with a shaft, a hoisting-drum, a hoisting-rope, and a bucket, of fast and loose pulleys mounted on the shaft, a belt for driving the fast pulleys to rotate said shaft, mechanism thrown into action by a part of the bucket to shift the belt to the loose pulley when the bucket has been elevated, and pawl-and-ratchet mechanism for controlling the descent of the bucket, substantially as described.

3. The combination, with a shaft, a hoisting-drum, a hoisting-rope, and a bucket, of fast and loose pulleys on the shaft, a belt for driving the fast pulley to rotate the shaft, a belt-shifting bar, a device located in the path of a part of the bucket for detaining said bar in position to hold the belt on the fast pulley, and means for automatically moving the belt-shifting bar when its detaining device is released by the action of a part of the bucket after the latter has been elevated, substantially as described.

4. The combination, with a shaft, a hoisting-drum, a hoisting-rope, and a bucket, of fast and loose pulleys on the shaft, a belt for driving the fast pulley to rotate the shaft, a spring-pressed belt-shifting bar, and a stop engaging the belt-shifting bar and released therefrom by the action of a part of the bucket when the latter has been elevated, substantially as described.

5. The combination, with a bucket, lateral guides therefor, and a shaft 16, of a hoisting-drum mounted upon said shaft, a hoisting-rope wound around said drum and connected to said bucket, loose pulleys 19 20 and fast pulley 21, mounted upon said shaft, means for locking said shaft to the pulley 19 when it rotates in one direction, belts 28 29, gearing said pulleys to suitable driving mechanism, and means for shifting the belt 29 to the loose pulley 20, substantially as and for the purpose specified.

6. The combination, with a bucket, lateral guides therefor, shaft 16, hoisting-drum mounted thereupon, and a hoisting-rope connected to said drum and to the bucket, of loose pulleys 19 and 20 and fast pulley 21, mounted upon said shaft, ratchet-wheel 22, rigidly connected to said shaft, pawl 23, mounted upon said pulley 19 and adapted to engage the teeth of said wheel 22, shaft 25, having pulley 27, belts 28 and 29, and means for shifting the belt 29 laterally, substantially as and for the purpose specified.

7. The combination, with a bucket, lateral guides therefor, shaft 16, hoisting-drum mounted thereupon, and a hoisting-rope connected to said drum and to the bucket, of loose pulleys 19 and 20 and fast pulley 21, mounted upon said shaft, ratchet-wheel 22, rigidly connected to said shaft, pawl 23, mounted upon said pulley 19 and adapted to engage the teeth of said wheel 22, shaft 25, having pulley 27, belts 28 and 29, and means for automatically shifting the belt 29 laterally when the bucket shall have reached its uppermost point, substantially as and for the purpose specified.

8. The combination, with a bucket, lateral guides therefor, shaft 16, a hoisting-drum mounted thereupon, and a hoisting-rope connected to said drum and to said bucket, of pulleys 19, 20, and 21, mounted upon said shaft, belts 28 and 29 for driving said pulleys, cross-bar 30, adapted to shift the belt 29 laterally, a stop adapted to hold said bar in a fixed position, and means for releasing said stop and causing said bar to move transversely to shift the belt 29, substantially as and for the purpose specified.

9. The combination, with a bucket, lateral guides therefor, shaft 16, drum mounted upon said shaft, hoisting-rope connected to said drum and to the bucket, and pulleys 19, 20, and 21, mounted upon said shaft, of belts 28 and 29, cross-bar 30, adapted when moved transversely to shift the belt 29, a spring adapted to move said bar transversely to hold the belt 29 upon the pulley 20, means for moving the cross-bar 30 transversely to shift the belt 29 to the pulley 21, a stop for holding said cross-bar in such position that the belt 29 will operate upon the pulley 21, and means for automatically releasing said bar to permit of its being operated by said spring when the bucket reaches its uppermost position, substantially as described.

10. The combination, with a bucket, lateral guides therefor, a bail carried by said bucket, shaft 16, hoisting-drum mounted thereupon, hoisting-rope connected to said drum and to the bail of the bucket, and pulleys 19, 20, and 21, mounted upon said shaft, of a wheel 22, pawl 23, belts 28 and 29, cross-bar 30, having a slot 41, spring-stop 42, having an upwardly-projecting end 43, spring 33, acting upon said cross-bar 30 to move it transversely, and means for moving said cross-bar in a direction opposite to that in which it is moved by the spring 33, the arrangement of the spring 42 and bucket-bail being such that when the bucket reaches its uppermost position the bail will move the spring 42 upward, substantially as and for the purpose specified.

11. The combination, with a bucket having pins 11 and 12 and bail 10, lateral guides 8 and 9 for said pins and bail, shaft 16, drum carried thereby, and a hoisting-rope connected to said drum and to the bail 10, of pulleys 19, 20, and 21, mounted upon said shaft, ratchet-wheel 22, mounted upon said shaft, pawl 23, mounted upon said pulley 19 and adapted to engage the teeth of said wheel 22, belts 28 and 29, cross-bar 30, adapted to be moved transversely to shift the belt 29 from the pulley 21 to the pulley 20, spring 33, operating upon said cross-bar to move it transversely, slot 41 in said bar, spring 42, adapted to fit into said slot, said spring 42 having an upwardly-projecting portion 43, said portion 43 being so placed that when the bucket reaches its uppermost position the bail 10 will engage said projecting portion and lift the spring 42 from the slot 41, levers 37 and 44, and rod 40 for moving the cross-bar transversely against the action of the spring 33, substantially as described.

CHRISTEN J. JEPPESEN.

Witnesses:
CHRISTEN CHRISTENSEN,
JOHN SKELTON.